US006446841B1

(12) United States Patent
Petit

(10) Patent No.: US 6,446,841 B1
(45) Date of Patent: Sep. 10, 2002

(54) PRE-COMPRESSION SPRAY PUMP

(75) Inventor: Ludovic Petit, Vitot (FR)

(73) Assignee: Valois S.A., Le Neubourg (FR)

( * ) Notice: Subject to any disclaimer, the term of this patent is extended or adjusted under 35 U.S.C. 154(b) by 0 days.

(21) Appl. No.: 10/018,427

(22) PCT Filed: Dec. 20, 2001

(86) PCT No.: PCT/FR00/01717

§ 371 (c)(1), (2), (4) Date: Dec. 20, 2001

(87) PCT Pub. No.: WO01/02100

PCT Pub. Date: Jan. 11, 2001

(30) Foreign Application Priority Data

Jun. 30, 1999 (FR) ............................................ 99 08361

(51) Int. Cl.[7] ................................................ G01G 11/94
(52) U.S. Cl. .................................................... 222/321.9
(58) Field of Search ............................. 222/321.9, 341, 222/383.1, 385, 321.2

(56) References Cited

U.S. PATENT DOCUMENTS

| | | | | |
|---|---|---|---|---|
| 5,105,994 A | * | 4/1992 | Jouillat et al. | 222/321.9 |
| 5,626,264 A | * | 5/1997 | Florez et al. | 222/321.9 |
| 6,170,713 B1 | * | 1/2001 | Schultz | 222/321.9 |
| 6,340,102 B1 | * | 1/2002 | Su | 222/321.9 |

* cited by examiner

*Primary Examiner*—Lesley D. Morris
*Assistant Examiner*—Thach H Bui
(74) *Attorney, Agent, or Firm*—Sughrue Mion, PLLC

(57) ABSTRACT

A pre-compression pump for dispensing metered quantities of fluid, said pump including a piston (1) secured to or integral with an actuating rod (2) and slidably-received in a pump body (3) including a pump chamber (10) defined between an inlet valve (11) and an outlet valve (12), said pre-compression pump being characterized in that, when the pump is actuated, said outlet valve (12) is urged towards its closed position by the pressure of the fluid contained in the pump chamber (10), and in that, at the end of the actuating stroke of the pump, a lever element (30) moves said outlet valve (12) towards its open position to enable the fluid contained in the pump chamber (10) to be expelled.

9 Claims, 5 Drawing Sheets

PRE-COMPRESSION SPRAY PUMP

The present invention relates to a pre-compression pump for dispensing metered quantities of fluid, and, more generally, to a pre-compression pump in which the fluid is dispensed independently of the actuating force exerted on the pump by the user.

Documents WO 87/04373 and EP-0 265 270 disclose pumps of this type. When the pump is actuated, a spring is compressed under the effect of the pressure generated inside the pump chamber, said spring being released at the end of the actuating stroke, after an outlet valve has opened, so that the metered quantity of fluid contained in the pump chamber is expelled by said spring, independently of the actuating force of the user.

In order to ensure that this type of device operates reliably, the outlet valve of the pump chamber must guarantee that the pump chamber is closed off in totally-leaktight manner throughout the entire actuating stroke of the pump, and can open only at the very end of the actuating stroke of said pump, so as to enable the fluid to be expelled. In the above-mentioned documents of the state of the art, the outlet valve is made in the form of an elastically-deformable sleeve disposed between the pump body and the moving actuating rod of the pump. The valve must be stiff enough so that it is not deformed while the pump is being actuated, under the effect of the pressure generated in the pump chamber. It opens by being deformed elastically at the end of the actuating stroke, by means of a shoulder formed in the pump body. That type of valve member suffers from the drawback that it must be both stiff enough not to be deformed before the end of the stroke of the pump, and also deformable enough so that, at the end of the actuating stroke, it can be deformed without having to apply too much force, under the effect of a mechanical cam. It is difficult to strike a satisfactory balance between these two contradictory requirements, and said outlet valve can cause the pump to operate unreliably. In particular, the slightest differences in size or stiffness due to the manufacturing tolerances of the outlet valve can cause such a malfunction.

An object of the present invention is to provide a pre-compression pump, in particular a pre-compression pump in which the fluid is dispensed independently of the actuating force of the user, and that does not reproduce the above-mentioned drawbacks.

Another object of the invention is to provide such a pre-compression pump that is simple and easy to manufacture and to assemble, and that is reliable to use.

Another object of the present invention is to provide such a pre-compression pump that guarantees that the contents of the pump chamber are dispensed totally and reproducibly each time the pump is actuated, independently of the actuating force of the user.

The present invention thus provides a pre-compression pump for dispensing metered quantities of fluid, said pump including a piston secured to or integral with an actuating rod and slidably-received in a pump body including a pump chamber defined between an inlet valve and an outlet valve, said pre-compression pump being characterized in that, when the pump is actuated, said outlet valve is urged towards its closed position by the pressure of the fluid contained in the pump chamber, and in that, at the end of the actuating stroke of the pump, a lever element moves said outlet valve towards its open position to enable the fluid contained in the pump chamber to be expelled.

Thus, unlike in the prior art devices, the outlet valve of the pump of the present invention does not have to withstand the pressure of the fluid throughout the entire actuating stroke of the pump, but rather it is urged towards its closed position by the fluid contained in the pump chamber. There is therefore no risk of the outlet valve opening early. In addition, because the outlet valve is urged towards its closed position by the pressure of the fluid contained in the pump chamber, it does not have to be made with a predetermined stiffness, and it is easy for a lever element to open it at the end of the actuating stroke without having to overcome resistance to deformation inherent to the material of the outlet valve, as is necessary in the prior art devices.

Advantageously, said lever element is mounted to slide with said piston and said outlet valve to reach a cam member which is secured to or integral with the pump body and which, at the end of the actuating stroke of the pump, deforms and/or displaces the lever element so as to open the outlet valve.

Advantageously, said cam member is formed by a shoulder in the pump body.

In a first advantageous variant embodiment of the present invention, said lever element is made integrally with said outlet valve.

In a second advantageous variant embodiment of the present invention, said lever element is made separately from said outlet valve.

Preferably, when the pump is in the rest position, said inlet valve is urged towards its open position by a spring, and, when the pump is actuated, said inlet valve is urged towards its closed position and moves by compressing the spring under the effect of the pressure of the fluid contained in the pump chamber, said spring being released suddenly when the outlet valve opens at the end of the actuating stroke of the pump, thereby bringing the inlet valve back towards its rest position and expelling the fluid contained in the pump chamber independently of the actuating force exerted on the pump by the user.

Advantageously, said spring of the inlet valve also returns the piston to its rest position.

Advantageously, said inlet valve is made in the form of a hollow cylinder closed at one end by an end wall, the edge of the open end of said hollow cylinder co-operating, as of the beginning of the actuating stroke of the pump, with a cylinder of the pump body to close the inlet valve, the spring bearing at one end against the end wall of the inlet valve and at its other end against a portion of the pump body.

The present invention also provides a fluid dispenser device, characterized in that it includes such a pre-compression pump.

The characteristics and advantages of the present invention appear more clearly from the following detailed description of two advantageous variant embodiments of the invention given by way of non-limiting example and with reference to the accompanying drawings, in which.

Figure 1:
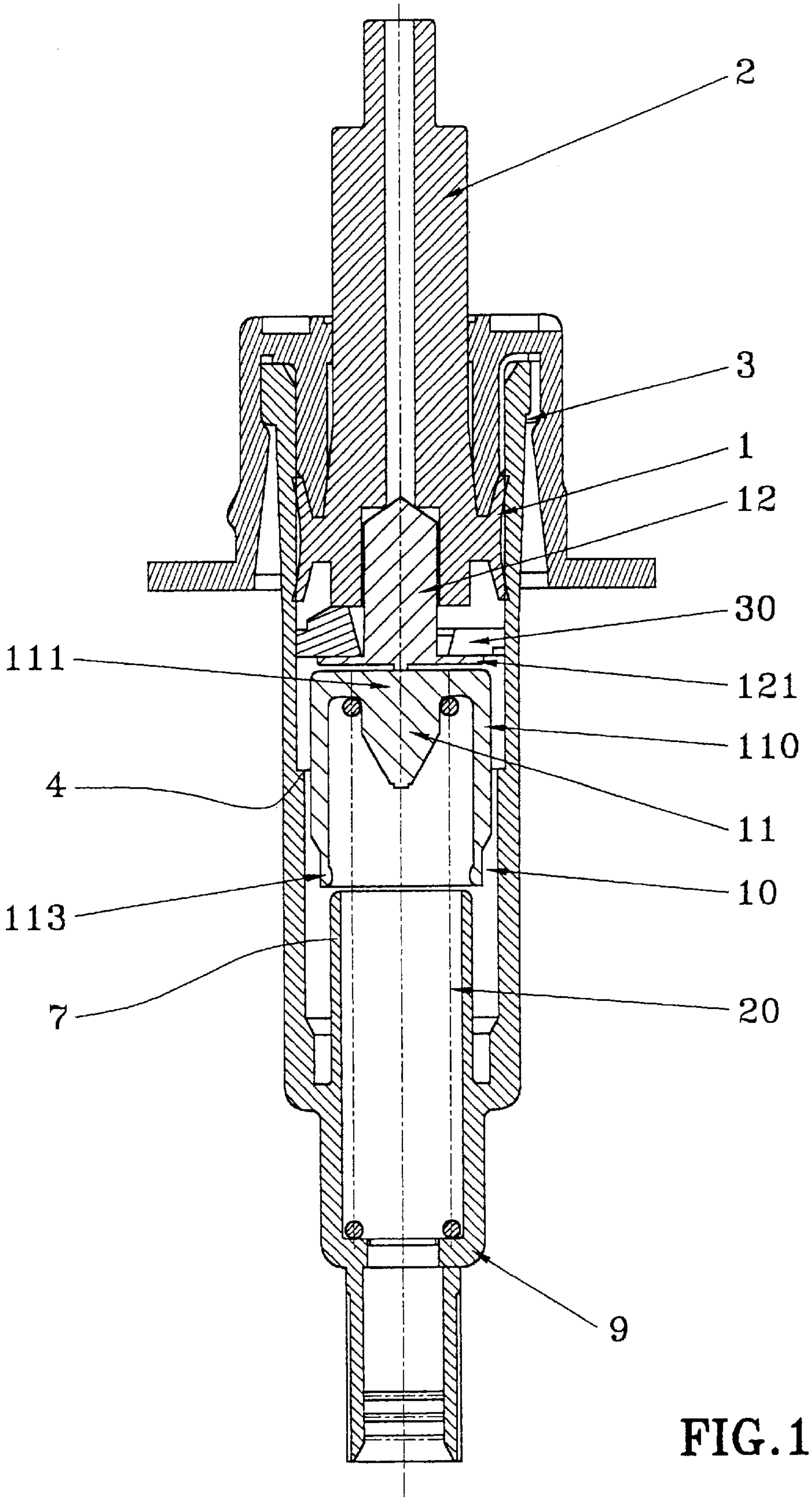
FIG. 1 is a diagrammatic section view of a first advantageous variant embodiment of a pump of the invention, shown in the rest position.

The present invention is described below with reference to three embodiments of a pre-compression pump, in which the fluid contained in the pump chamber is expelled independently of the actuating force exerted on the pump by the user. However, it is naturally to be understood that the present invention applies to any type of pre-compression pump, and that it is not limited to the embodiments shown in the drawings.

With reference to the drawings, a pre-compression pump includes a pump body 3 slidably receiving a piston 1 which is secured to or integral with an actuating rod 2 that the user depresses to actuate the pump. The piston 1 is mounted to slide in a pump chamber 10 defined in the pump body 3 between an inlet valve 11 and an outlet valve 12.

Figure 3:
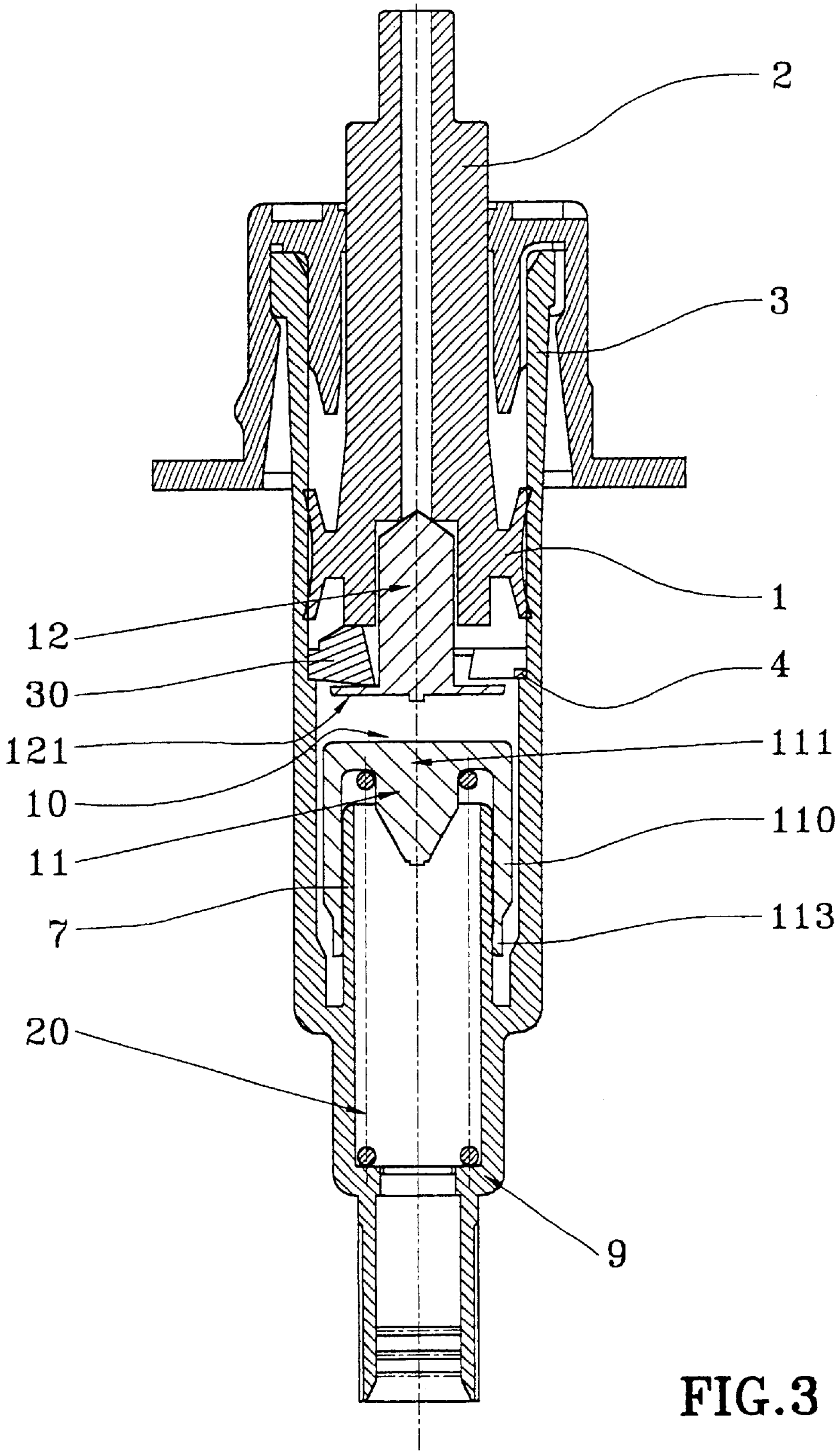
FIG. 3 is figure similar to FIGS. 1 and 2, the pump being shown in its position at the end of the actuating stroke.

In the invention, the outlet valve 12 is made such that, when the pump is actuated, it is urged towards its closed position by the pressure of the fluid contained in the pump chamber 10. It is only at the end of the actuating stroke of the pump that said outlet valve 12 is moved to its open position so as to enable the fluid contained in the pump chamber 10 to be expelled. In the invention, the outlet valve is opened by means of a lever 30 which is preferably disposed between the actuating rod 2 and said outlet valve 12. Advantageously, as shown in the drawings, the lever element 30 is disposed between the outlet valve 12 and the actuating rod 2, the unit formed by the actuating rod 2, by the outlet valve 12, and by the lever element 30 being mounted to slide in the pump body 3 together with the piston 1, when the pump is actuated. Advantageously, the pump body 3 is provided with a cam member 4 which, at the end of the actuating stroke of the pump (as shown in FIG. 3), deforms and/or displaces the lever element 30 so as to open the outlet valve 12. In particular, the cam member 4 may be formed by a shoulder in the pump body.

The present invention is more particularly applicable to pre-compression pumps in which the fluid contained in the pump chamber 10 is expelled independently of the actuating force exerted by the user. To this end, the inlet valve 11 may co-operate with a spring 20 which, when the pump is actuated, is compressed by the inlet valve 11 moving under the effect of the pressure generated in the pump chamber 10. At the end of the actuating stroke of the pump, when the outlet valve 12 is opened by the lever 30, said compressed spring 20 is released suddenly, so that the fluid contained in the pump chamber 10 is expelled by means of said spring. Preferably, as shown in the drawings, said spring 20 of the inlet valve 11 also acts as a return spring for the pump so as to bring the piston 1 back to its rest position after the fluid has been expelled. Advantageously, said inlet valve 11 may be made in the form of a hollow cylinder 10 closed at one end by an end wall 111, the edge 113 of the open end of said hollow cylinder 10 co-operating as of the beginning of the actuating stroke of the pump with a cylinder 7 of the pump body 3 so as to close the inlet valve 11. The spring 20 advantageously bears at one end against the end wall 111 of the inlet valve 11 and at its other end against a portion 9 of the pump body 3. Naturally, the invention is not limited to this advantageous embodiment of the inlet valve.

Figure 2:
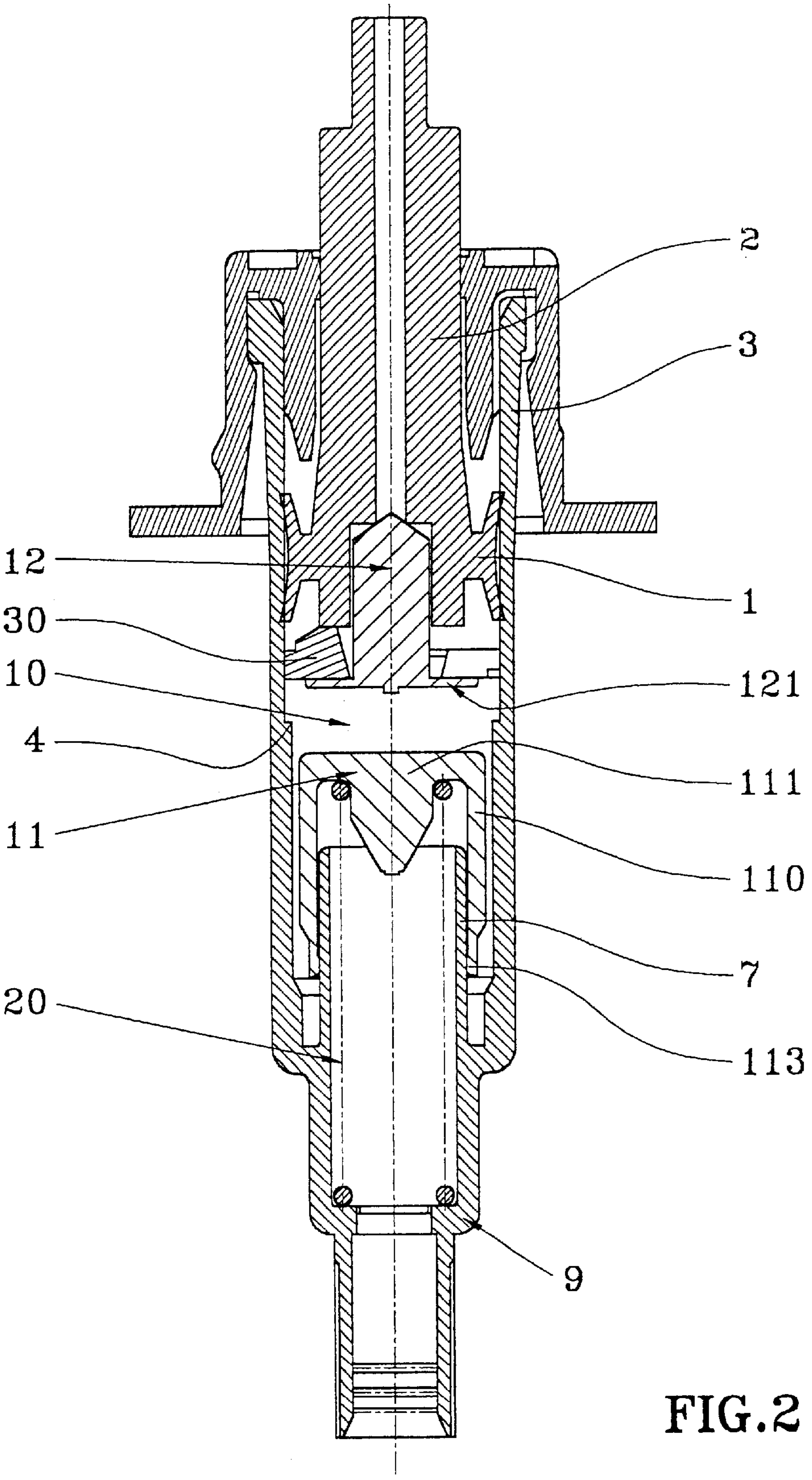
FIG. 2 is a figure similar to FIG. 1, the pump being shown in a position during the actuating stroke.

The pump thus operates as follows: when the pump is in the rest position (as shown in FIG. 1), the inlet valve 11 is urged towards its open position by the spring 20. When the pump is actuated, the inlet valve 11 is urged towards its closed position by the pressure of the fluid contained in the pump chamber 10, and it moves by compressing the spring 20 under the effect of said pressure of the fluid. Simultaneously, the outlet valve 12 is urged towards its closed position, also by the pressure of the fluid contained in the pump chamber 10, as shown in FIG. 2. At the end of the actuating stroke of the pump (FIG. 3), the outlet valve 12 is opened by the lever element 30 co-operating with the shoulder 4 of the pump body, thereby releasing the spring 20 suddenly, the spring thus bringing the inlet valve 11 back to its starting position by expelling the fluid contained in the pump chamber 10 independently of the actuating force exerted on the pump by the user. The reliability of the pump of the invention is improved by the fact that there is no risk of the outlet valve 12 opening before the end of the actuating stroke of the pump.

FIGS. 1 to 3 show a first advantageous variant embodiment of the outlet valve 12. In this first variant embodiment, the outlet valve 12 and the lever element 30 are made separately. The outlet valve 12 is disposed at the bottom end of the actuating rod 2 inside the pump chamber 10, and the lever element 30 is advantageously disposed between the actuating rod 2 and said outlet valve 12. The outlet valve may advantageously include a radial wall 121 which holds the lever element 30 against the bottom end of the actuating rod 2 and said valve 12. Thus, as shown in FIG. 3, when the lever element 30 reaches the level of the shoulder 4 in the pump body, the actuating rod 2 that continues to press on said lever element 30 causes it to tilt so that it co-operates with said wall 121 of the outlet valve 12 so as to move said outlet valve axially relative to the actuating rod 2, thereby opening said outlet valve, and so that said lever co-operates with said wall 121 of the outlet valve 12 to move said wall axially relative to the actuating rod 2, thereby opening said outlet valve and opening up the passageway for the fluid contained in the pump chamber 10. This very simple construction for the outlet valve 12 and for the lever element 30 does not require high precision on the dimensions of the elements, since the actuating rod 2, the lever element 30, and the outlet valve 12 co-operate with one another mechanically at the end of the actuating stroke of the pump.

Figure 4:
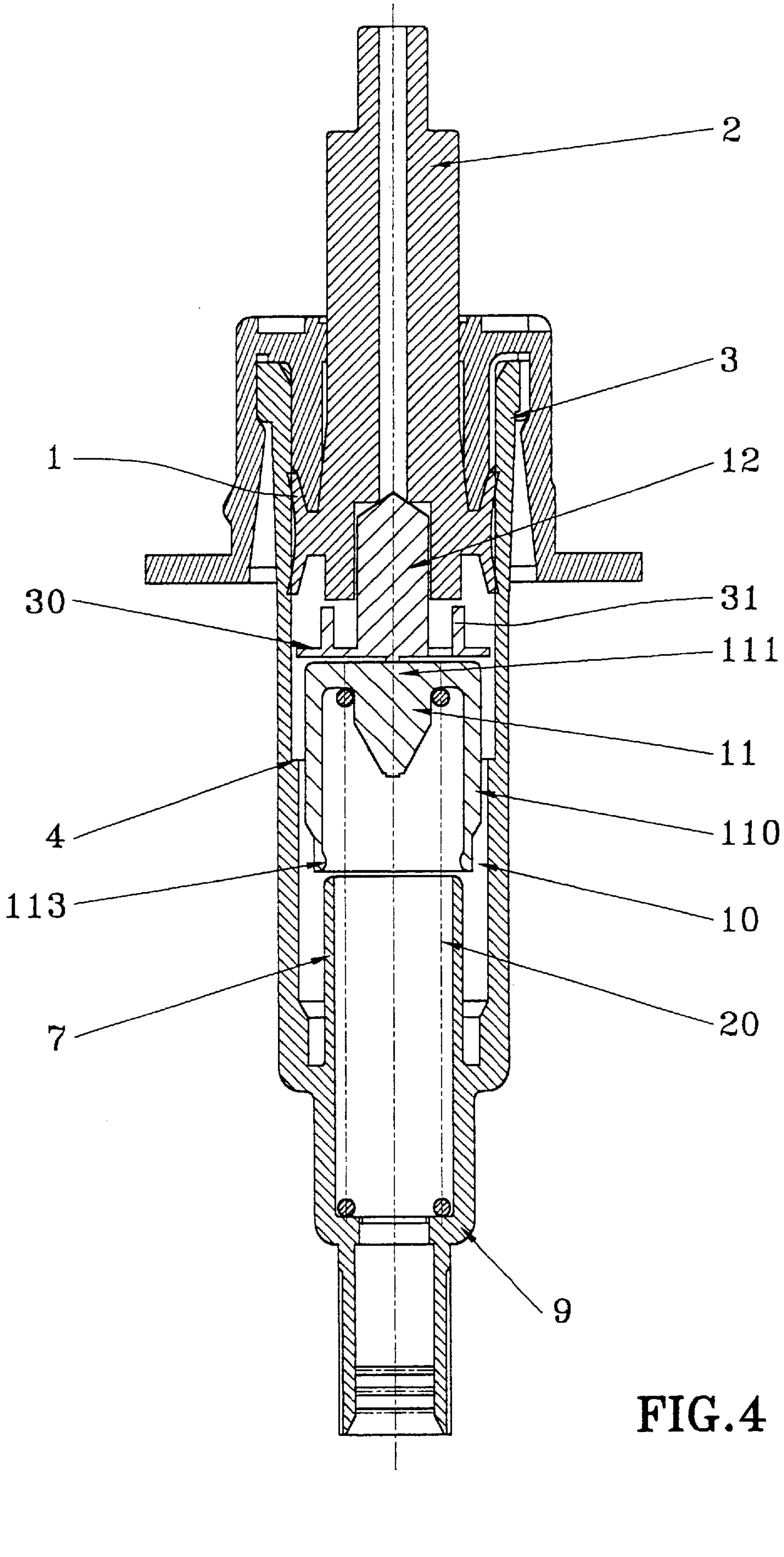
FIG. 4 is a diagrammatic section view of a second advantageous variant embodiment of the pump of the present invention, shown in the rest position.

FIG. 4 shows a second advantageous variant embodiment of the present invention, in which the outlet valve 12 and the lever element 30 are made integrally. In this case, the lever portion 30 of the outlet valve 12 is formed by a radial wall that co-operates via its radially-outermost end with the shoulder 4 in the pump body, and that is provided with an abutment member 31 which co-operates with the bottom end of the actuating rod 2. The lever element portion 30 is connected to the central body of the outlet valve 12 in deformable manner so that, when the outlet valve 12 reaches the shoulder 4 of the pump body, the radially-outermost end of said lever portion 30 bears against said shoulder 4, while the top end of the abutment member 31 co-operates with the actuating rod 2. Thus, at the end of the actuating stroke of the pump, the central portion of the outlet valve 12 is displaced axially relative to the actuating rod 2 so as to open the passageway enabling the fluid contained in the pump chamber to be expelled. This second variant embodiment is also very simple to manufacture and to assemble, and the reliability of the pump is also guaranteed.

Figure 5:
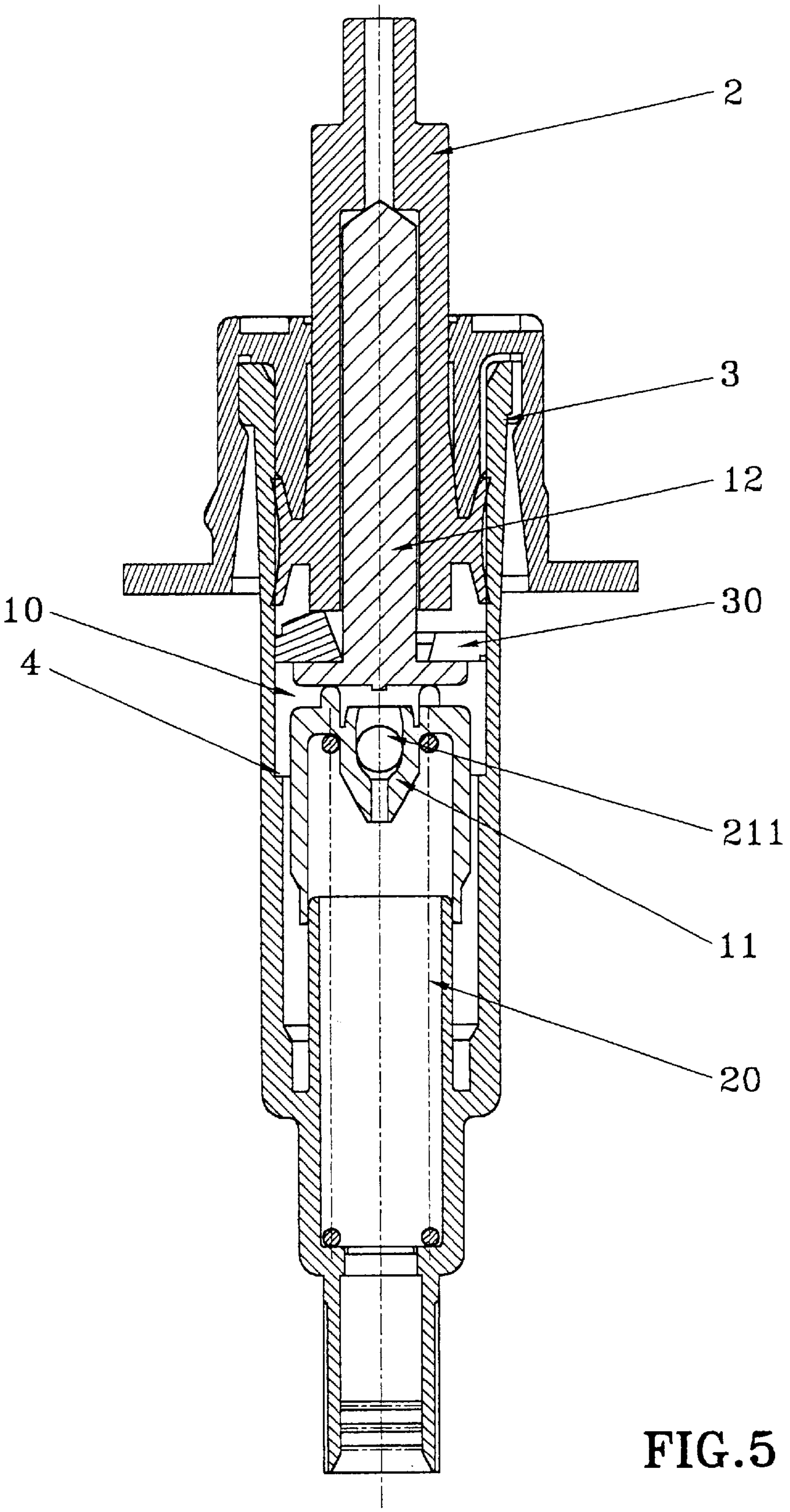
FIG. 5 is a diagrammatic section view of a third advantageous variant embodiment of the present invention, shown in the rest position.

FIG. 5 shows another variant embodiment, in which the inlet valve 11 incorporates a ball 211. When the pump is actuated, the ball 211 is urged into its closed position, and, when the pump returns to its rest position, said ball lifts off its valve seat so as to enable the metering chamber 10 to be filled. In this variant, the pump chamber is filled progressively while the piston is returning to its rest position. FIG. 5 also shows that the outlet valve 12 may extend in any manner in the actuating rod.

Naturally, the invention is not limited to the three embodiments of the outlet valve shown in the drawings, and indeed the scope of the invention is defined by the accompanying claims.

What is claimed is:

1. A pre-compression pump for dispensing metered quantities of fluid, said pump including a piston (1) secured to or integral with an actuating rod (2) and slidably-received in a pump body (3) including a pump chamber (10) defined between an inlet valve (11) and an outlet valve (12), said pre-compression pump being characterized in that, when the pump is actuated, said outlet valve (12) is urged towards its closed position by the pressure of the fluid contained in the pump chamber (10), and in that, at the end of the actuating stroke of the pump, a lever element (30) moves said outlet valve (12) towards its open position to enable the fluid contained in the pump chamber (10) to be expelled.

2. A pump according to claim 1, in which said lever element (30) is mounted to slide with said piston (1) and said outlet valve (12) to reach a cam member (4) which is secured to or integral with the pump body (3) and which, at the end of the actuating stroke of the pump, deforms and/or displaces the lever element (30) so as to open the outlet valve (12).

3. A pump according to claim 2, in which said cam member is formed by a shoulder in the pump body (3).

4. A pump according to claim 1, in which said lever element (30) is made integrally with said outlet valve (12).

5. A pump according to any one of claim 1, in which said lever element (30) is made separately from said outlet valve (12).

6. A pump according to claim 1, in which, when the pump is in the rest position, said inlet valve (11) is urged towards its open position by a spring (20), and, when the pump is actuated, said inlet valve (11) is urged towards its closed position and moves by compressing the spring (20) under the effect of the pressure of the fluid contained in the pump chamber (10), said spring (20) being released suddenly when the outlet valve (12) opens at the end of the actuating stroke of the pump, thereby bringing the inlet valve (11) back towards its rest position and expelling the fluid contained in the pump chamber (10) independently of the actuating force exerted on the pump by the user.

7. A pump according to claim 6, in which, in addition to expelling the fluid, said spring (20) of the inlet valve (11) also returns the piston (1) to its rest position.

8. A pump according to claim 6, in which said inlet valve (11) is made in the form of a hollow cylinder (10) closed at one end by an end wall (111), the edge (113) of the open end of said hollow cylinder (10) co-operating, as of the beginning of the actuating stroke of the pump, with a cylinder (7) of the pump body (3) to close the inlet valve (11), the spring (20) bearing at one end against the end wall (111) of the inlet valve (11) and at its other end against a portion (9) of the pump body (3).

9. A fluid dispenser device, characterized in that it includes a pre-compression pump according to claim 1.

* * * * *